(12) United States Patent
Meade et al.

(10) Patent No.: US 8,644,649 B2
(45) Date of Patent: Feb. 4, 2014

(54) OPTICAL WAVEGUIDE WITH CASCADED MODULATOR CIRCUITS

(75) Inventors: Roy Meade, Boise, ID (US); Gurtej Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 292 days.

(21) Appl. No.: 13/117,844

(22) Filed: May 27, 2011

(65) Prior Publication Data

US 2012/0301068 A1    Nov. 29, 2012

(51) Int. Cl.
*G02F 1/035*    (2006.01)
*G02F 1/295*    (2006.01)

(52) U.S. Cl.
USPC ........... 385/2; 385/8; 385/9; 385/24; 359/238

(58) Field of Classification Search
USPC ........ 385/2, 8, 9, 24; 359/237–239, 290, 315, 359/316, 320
See application file for complete search history.

(56) References Cited

U.S. PATENT DOCUMENTS

| | | |
|---|---|---|
| 4,048,591 A | 9/1977 | Auracher |
| 5,023,944 A | 6/1991 | Bradley |
| 5,249,243 A | 9/1993 | Skeie |
| 5,416,867 A | 5/1995 | Thorsten et al. |
| 6,580,851 B1 * | 6/2003 | Vahala et al. .................... 385/30 |
| 6,636,668 B1 * | 10/2003 | Al-hemyari et al. ............. 385/40 |
| 7,245,801 B2 * | 7/2007 | Boyd et al. ....................... 385/27 |
| 7,613,367 B2 | 11/2009 | Levy et al. |
| 8,519,803 B2 * | 8/2013 | McLaren et al. ............. 333/17.1 |
| 2011/0293216 A1 * | 12/2011 | Lipson et al. .................... 385/14 |
| 2012/0062974 A1 * | 3/2012 | Manipatruni et al. ........ 359/238 |

FOREIGN PATENT DOCUMENTS

| | | |
|---|---|---|
| JP | 2006216722 A | 8/2006 |
| WO | WO 00/35057 A2 | 6/2000 |
| WO | WO 2008/024513 A2 | 2/2008 |
| WO | WO 2010/087790 A1 | 8/2010 |
| WO | WO 2010/108093 A2 | 9/2010 |

* cited by examiner

*Primary Examiner* — Daniel Petkovsek
(74) *Attorney, Agent, or Firm* — Dickstein Shapiro LLP

(57) ABSTRACT

A silicon optical waveguide for transmitting an optical signal input to the optical waveguide with a first frequency. The optical waveguide includes a plurality of modulator circuits configured along a silicon optical transmission channel. Each modulator circuit includes at least one resonant structure that resonates at the first frequency when the modulator circuit that includes the at least one resonant structure is at a resonant temperature. Each modulator circuit has a different resonant temperature.

27 Claims, 10 Drawing Sheets

910A

610

OPTICAL WAVEGUIDE WITH CASCADED MODULATOR CIRCUITS

FIELD OF THE INVENTION

The embodiments of the invention relate generally to the field of silicon optical waveguides and, more particularly, to optical modulating circuits in silicon optical waveguides.

BACKGROUND OF THE INVENTION

Silicon-based integrated circuits have long been used as a platform for microelectronic applications. For example, microprocessors in computers, automobiles, avionics, mobile devices, control and display systems and in all manner of consumer and industrial electronics products are all traditionally based on a silicon platform that facilitates and directs the flow of electricity. As processing requirements have increased, the design of silicon-based integrated circuits has adapted to accommodate for faster processing times and increased communication bandwidths. Primarily, such performance gains have been the result of improvements in feature density, meaning that technologies have been developed to crowd ever-increasing numbers of features such as transistors onto a silicon chip. While efforts to increase feature density continue, alternative methods for increasing processing speeds and bandwidth on silicon-based platforms are also being developed. One such method is known as silicon photonics.

The term "silicon photonics" relates to the study and application of photonic systems that use silicon as an optical medium. Thus, instead of or in addition to using silicon to facilitate the flow of electricity, silicon is used to direct the flow of photons or light. While the speed of electricity and the speed of light are the same, light is able to carry data over a wider range of frequencies than electricity, meaning that the bandwidth of light is greater than that of electricity. Thus, a stream of light can carry more data than a comparable stream of electricity can during the same period of time. Accordingly, there are significant advantages to using light as a data carrier. Furthermore, using silicon as a preferred optical medium allows for application of and tight integration with existing silicon integrated circuit technologies. Silicon is transparent to infrared light with wavelengths above about 1.1 micrometers. Silicon also has a high refractive index of about 3.5. The tight optical confinement provided by this high index allows for microscopic optical waveguides, which may have cross-sectional dimensions of only a few hundred nanometers, thus facilitating integration with current nanoscale semiconductor technologies. Thus, silicon photonic devices can be made using existing semiconductor fabrication techniques, and because silicon is already used as the substrate for most integrated circuits, it is possible to create hybrid devices in which the optical and electronic components are integrated onto a single microchip.

In practice, silicon photonics are implemented using silicon-on-insulator, or SOI, technology. In order for the silicon photonic components to remain optically independent from the bulk silicon of the wafer on which they are fabricated, it is necessary to have an intervening material. This is usually silica, which has a much lower refractive index of about 1.44 in the wavelength region of interest. This results in total internal reflection of light at the silicon-silica interface and thus transmitted light remains in the silicon.

A typical example of data propagation using light is illustrated in FIG. 1. FIG. 1 illustrates an optical transmission system 100 that includes, for example, a silicon waveguide 110. The silicon waveguide may make up the entirety of the optical transmission system 100 or just one or more portions of the system 100. The system includes multiple data input channels 120, where each channel 120 transmits data in the form of pulses of light. In order to simultaneously transmit the data carried on the multiple data channels 120, the light in each channel 120 is modulated by a frequency modulator 130. The modulated light from each channel 120 is then combined into a single transmission channel 150 using an optical multiplexer 140. The multiplexed light is then transmitted along the single transmission channel 150 to an endpoint (not shown) where the light is de-multiplexed and demodulated before being used by an endpoint device.

Transmission of light in an optical waveguide is, however, affected by temperature. In general, changes in temperature can result in changes in the device dimensions (due to thermal expansion) and refractive indices of the materials used in the optical waveguide. More particularly, changes in temperature can affect the operation of the optical frequency modulators 130 illustrated in FIG. 1. Resonant photonic modulators are designed to only modulate received frequencies that are at or close to specific known frequencies. To only allow the modulation of the specific known frequencies, the modulators include resonant structures that act to filter out all but the known frequencies which are to be modulated by the modulators. Thus, the known frequencies are resonant frequencies of the resonant structures. Unfortunately, because the refractive indices of the resonant structures tend to change according to temperature, the specific frequencies that are modulated (i.e., the resonant frequencies) tend to deviate from the known frequencies as the temperature changes. Therefore, there is a need for silicon optical waveguides with modulator circuits that are tolerant of changes in temperature.

DETAILED DESCRIPTION OF THE INVENTION

Because silicon-based integrated circuits are used in a variety of products and circumstances, silicon-based integrated circuits are likely to be exposed to a wide range of temperature conditions. In silicon-based optical waveguides, however, temperature fluctuations can result in decreased performance of included optical frequency modulators. Therefore, in order to enable a silicon optical waveguide to be more robust to temperature changes, an improved silicon optical waveguide with optical frequency modulators is herein disclosed.

Figure 1:
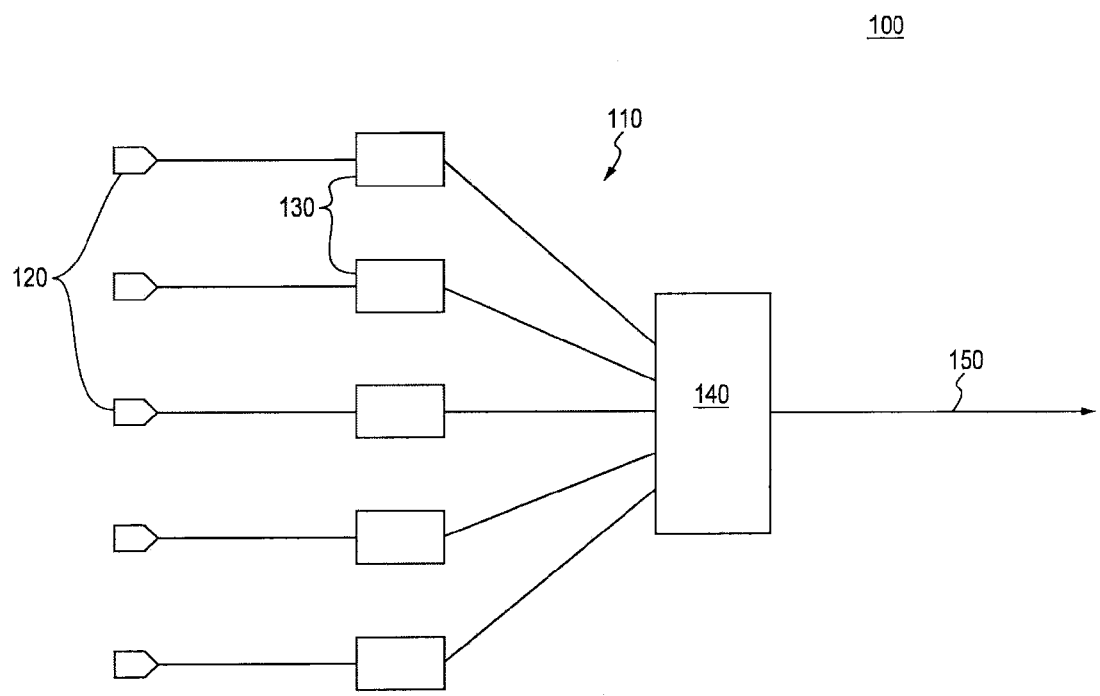
FIG. 1 illustrates an optical transmission system with a silicon optical waveguide.
Figure 2:
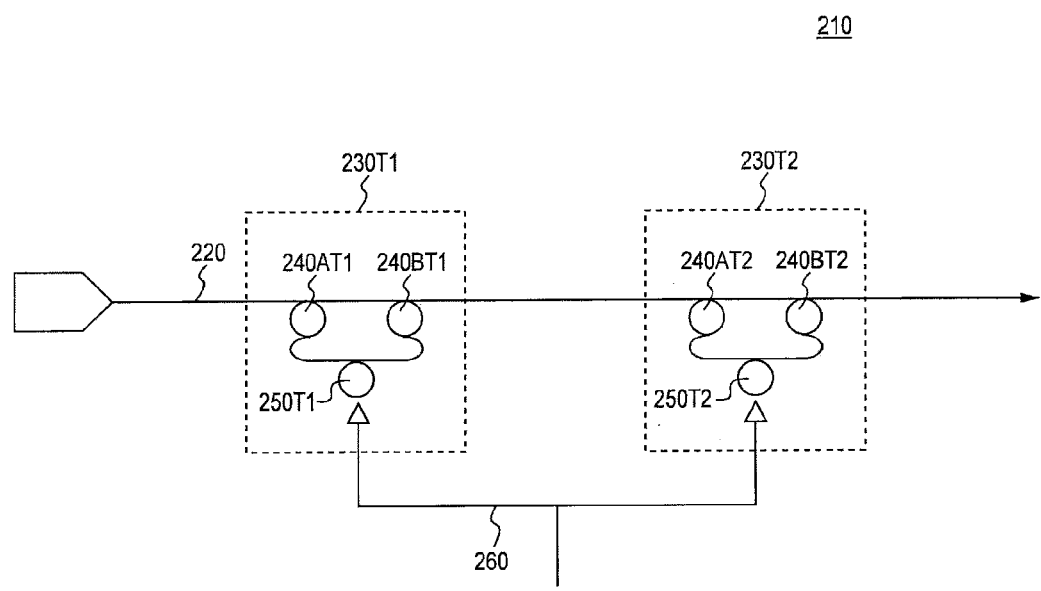
FIG. 2 illustrates a silicon optical waveguide in accordance with a disclosed embodiment.

One embodiment of an improved silicon optical waveguide 210 is illustrated in FIG. 2. The illustrated portion of the improved waveguide 210 includes an optical transmission channel 220 and two frequency modulator circuits 230T1, 230T2, each serially coupled to the waveguide 210. While only two frequency modulator circuits (referred to generally as 230) are illustrated, the improved silicon optical waveguide 210 could include any number of frequency modulator circuits 230, as will become clear in the following explanation. In FIG. 2, each modulator circuit 230 includes two switches (e.g., switches 240AT1, 240BT1) and a modulator (e.g., modulator 250T1). The switches (referred to generally as 240) are coupled to the waveguide 210 so as to allow optical signals of a specific frequency to be shunted from the waveguide 210 to a modulator (referred to generally as 250) which is configured in parallel with the waveguide 210. Thus, because the switches 240 are tuned to allow specific frequencies of optical signals access to the modulators 250, the switches 240 act like band-pass filters that provide filtered signals to the modulators 250. Optical signals that are not of the specific frequencies are allowed to continue without obstruction along the waveguide 210.

In each modulator circuit 230, one switch (e.g., switch 240AT1) is designated as an input switch (referred to generally as input switch 240A). The other switch in the modulator circuit 230, e.g., switch 240BT1, is designated as an output switch (referred to generally as output switch 240B). The input switch 240A couples optical signals from the optical transmission channel 220 to the modulator 250. The output switch 240B couples optical signals from the modulator 250 back to the optical transmission channel 220.

The switch frequency response is a result of the resonant properties of the switch 240. Resonant optical switches are switches that only fully pass or allow transmission of signals that have frequencies that match the switch resonant frequency. For example, a ring resonator switch is essentially a looped optical waveguide whose circumference allows for constructive interference of a desired frequency. An optical ring resonator whose circumference is equal to an integer-multiple of an optical signal's wavelength (e.g., λ, 2λ, 3λ, etc.) that corresponds to a desired frequency will fully pass or transmit a signal with the desired frequency because the signal experiences constructive interference as it travels around the optical ring resonator. Conversely, the same optical ring resonator will fully block an optical signal where the ring resonator's circumference is equal to an odd-numbered integer-multiple of one-half of the optical signal's wavelength (e.g., (1/2)λ, (3/2)λ, (5/2)λ, etc.) due to the destructive interference that is generated. The optical ring resonator will only partially pass other frequencies.

Figure 3:
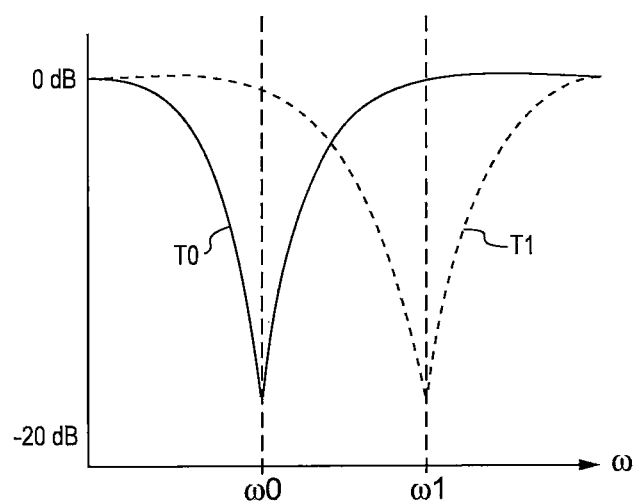
FIG. 3 illustrates a frequency/intensity graph for a ring resonator in accordance with a disclosed embodiment.

The frequency-pass characteristics of a ring resonator are illustrated in the graph 300 of FIG. 3. For a given temperature T0, a ring resonator will fully pass a signal at the ring's resonant frequency ω0. This is evidenced in the graph 300 by the deep trough at frequency ω0, which indicates the ring resonator is significantly more sensitive to signals at frequency ω0 than at other frequencies. Signals at frequencies that are far away from frequency ω0 are essentially blocked while signals at frequencies near frequency ω0 are only partially blocked. However, if the temperature changes to temperature T1, then the resonant frequency of the ring resonator is shifted to frequency ω1. Thus, the ring resonator acts as a temperature-dependent band-pass filter for the ring's resonant frequency.

Returning to FIG. 2, the ring resonator switches 24 provide filtered access to the optical modulators 250. The optical modulators 250 may be resonant modulators or any other type of frequency modulator. Like the switches 240, a resonant modulator is tuned to function at a specific temperature. Thus, as an example, a resonant modulator in series with a resonant switch is generally tuned to function at a temperature T0 that corresponds with the temperature T0 at which the switch passes a resonant frequency ω0. The optical modulators may also be of a non-resonant type. Irregardless, the resonant modulators 250 are driven by a common signal 260 to modulate the received frequency ω0 received via input switch 240A. The common signal 260 functions to inject charge into the modulators 250, thus altering the index of refraction of the modulators 250 in order to effectuate a frequency modulation. The modulated frequency is then coupled back onto the optical transmission channel 220 via output switch 240B.

In FIG. 2, each modulator circuit is tuned to a specific temperature. In other words, the switches 240 and modulator 250 within each modulator circuit 230 are selected and/or designed to filter and modulate a specific frequency at a specific temperature. In order to compensate for changes in temperature, each modulator circuit 230 is tuned to a temperature that is different from the tuned-temperature of the other modulator circuits 230. Thus, when one modulator circuit is inactive because the temperature is different from its tuned temperature, another modulator circuit whose tuned temperature corresponds with the actual temperature is active. In this way, the waveguide 210 is designed to accommodate frequency modulation at a variety of temperatures.

Figure 4:
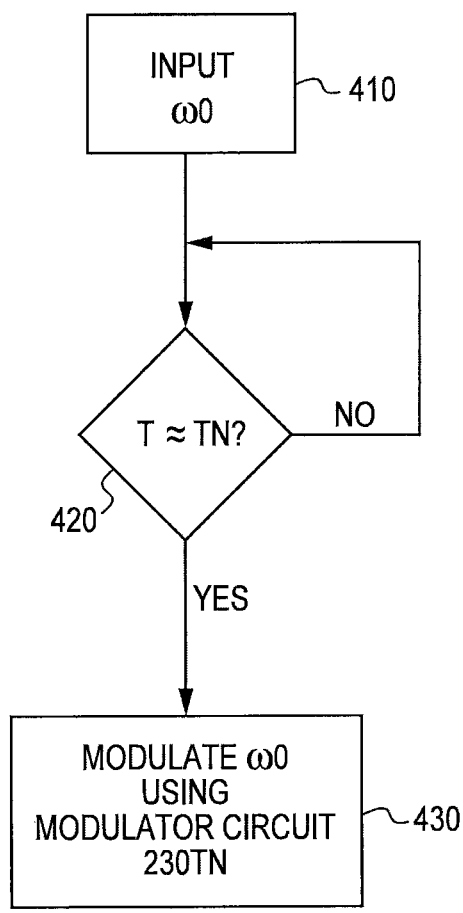
FIG. 4 illustrates a method of operating a silicon optical waveguide in accordance with a disclosed embodiment.

A method 400 of operation of the waveguide 210 of FIG. 2 is illustrated in FIG. 4. Initially, a laser input of a given frequency ω0 is input to the waveguide (step 410). The input frequency ω0 is to be modulated using one or more modulator circuits, depending on the waveguide temperature T. The modulator circuits are each tuned to modulate frequency ω0 at different temperatures. Thus, for example, modulator circuit 230T1 is tuned to modulate frequency ω0 at temperature T1. Modulator circuit 230T2 is tuned to modulate frequency ω0 at temperature T2 which differs from temperature T1. Additional modulator circuits 230TN may be included that each modulate frequency ω0 (step 430) at respective temperatures TN (step 420).

Figure 5:
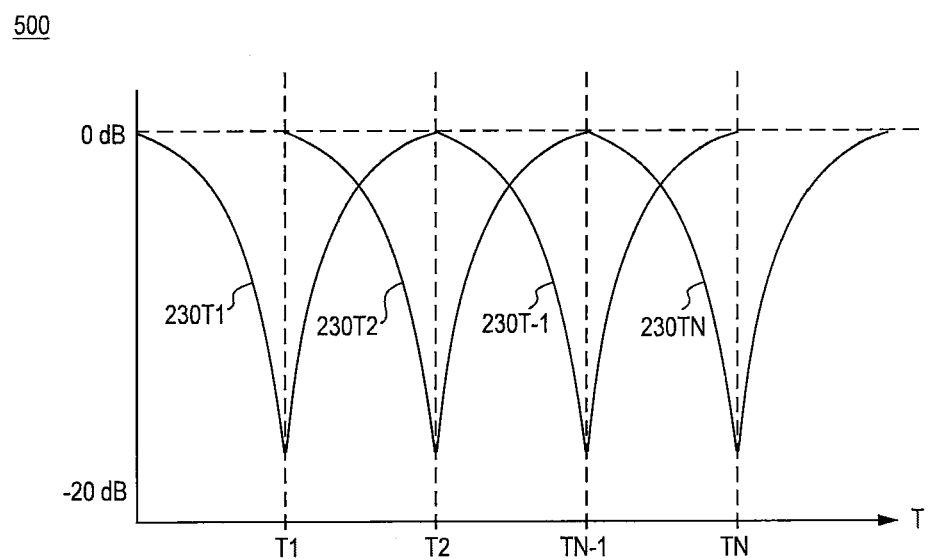
FIG. 5 illustrates a frequency/intensity graph for a silicon optical waveguide in accordance with a disclosed embodiment.

An intensity versus temperature graph 500 showing the response of all of the modulator circuits 230 at frequency ω0 is illustrated in FIG. 5. The graph illustrates that for a given frequency ω0, each modulator circuit is active within a different temperature range. For example, at temperature T1, modulator circuit 230T1 is fully active and no other modulator circuit is active. At temperature T2, modulator circuit 230T2 is fully active and no other modulator circuit is active. Similarly, at temperature TN, modulator circuit 230TN is fully active. At temperatures in between temperatures T1 and T2, both modulator circuits 230T1 and 230T2 are only partially active.

Graph 500 also illustrates the modulation depth or degree of modulation provided by the waveguide 210 at different temperatures T. For example, at temperature T1, the illustrated modulation depth is approximately −20 dB. At temperature T2, the illustrated modulation depth is also approximately −20 dB. However, at a temperature in between temperatures T1 and T2, the modulation depth provided by any one modulator circuit 230 is substantially less than −20 dB. Nevertheless, because of the overlap in modulator circuit activity, at temperatures in between temperatures T1 and T2, both modulator circuits 230T1 and 230T2 provide some modulation. The total modulation depth provided is thus the sum of overlapping modulation depths provided by individual modulator circuits 230.

It is possible to design a modulator array with a variable frequency response versus temperature graph so that overlapping of modulation depths only involves a few devices at any given temperature. Thus, during operation of the waveguide, if the waveguide temperature T is equal to temperature T1, modulator circuit 230T1 is active in modulating the received frequency $\omega 0$ while other modulator circuits 230T2, 230TN are not active. If the waveguide temperature T changes and equals temperature T2, modulator circuit 230T2 becomes active in modulating the received frequency $\omega 0$ while the other modulator circuits 230T1, 230TN are not active. If the waveguide temperature T changes and equals a temperature in between temperatures T1 and T2, both modulator circuits 230T1 and 230T2 become partially active in modulating the received frequency $\omega 0$ at a reduced modulation depth, though the modulator circuits 230T1, 230T2 may be designed and configured so that the sum of modulation from both modulator circuits 230T1, 230T2 may be approximately equal to the maximum modulation depth of any individual modulator circuit 230. This is the result when the modulation ranges of neighboring modulator circuits 230 overlap at a point where each modulator circuit's modulation depth is approximately one-half of the circuit's maximum modulation depth. Alternatively, some variance in modulation depth may be tolerated. For example, depending on the waveguide system's noise tolerance, a modulation depth of seventy-percent of the maximum modulation depth may be tolerated.

Thus, the optical waveguide system facilitates frequency modulation within a range of temperatures, where the temperature range is dependent upon the number of modulator circuits placed in series in the waveguide and the characteristics (e.g., the frequency/temperature response) of the modulator circuits.

Figure 6:
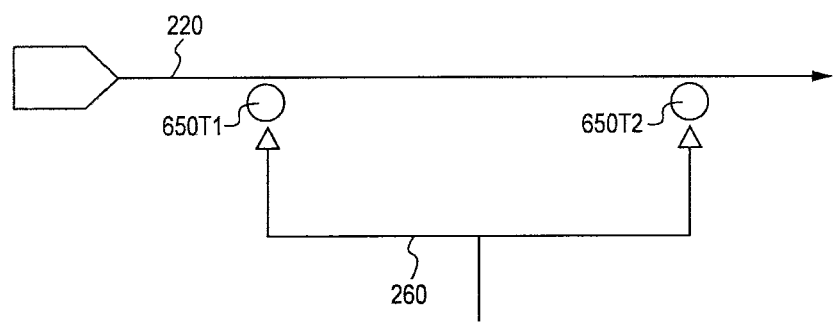
FIG. 6 illustrates a silicon optical waveguide in accordance with a disclosed embodiment.
Figure 7:
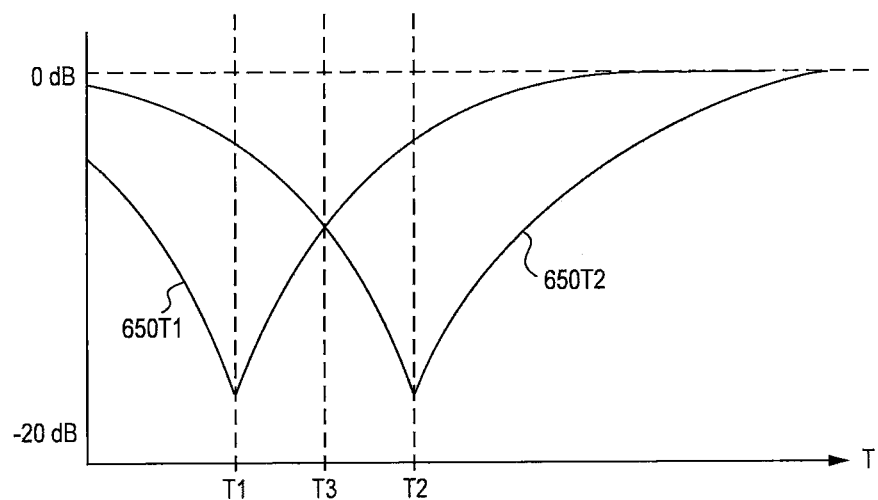
FIG. 7 illustrates a frequency/intensity graph for a silicon optical waveguide in accordance with a disclosed embodiment.

In another embodiment, the resonant switches are removed and only resonant ring modulators are provided in series with the optical waveguide. FIG. 6 illustrates this "switchless" embodiment of an optical waveguide 610. In the embodiment of FIG. 6, two or more modulators (referred to generally as modulators 650) are positioned in series along the waveguide 610. The modulators 650 are selected and/or designed to be resonant at a frequency $\omega 0$ at different temperatures. Or, in other words, for a given temperature T, each modulator has a different resonant frequency. The resonant frequencies of neighboring modulators 650 are offset such that modulation overlap between the neighboring modulators 650 occurs with a modulation depth for each modulator 650 equal to approximately one-half their greatest modulation depth, as illustrated in FIG. 7. Thus, at a given temperature, T1, the optical circuit is designed such that a first modulator 650T1 is resonant. At a temperature T2, the first modulator 650T1 is no longer resonant, but a second modulator 650T2 is resonant. At a temperature T3 in between temperatures T1 and T2, both the first and second modulators 650T1, 650T2 are partially resonant. In this way, by cascading multiple modulators 650 in series with the optical transmission channel 220, the optical waveguide 610 is made to be more robust against fluctuations in temperature. The number of modulators 650 used in the waveguide 610 is not limited except by considerations of cost, space and overall need.

Figure 8:
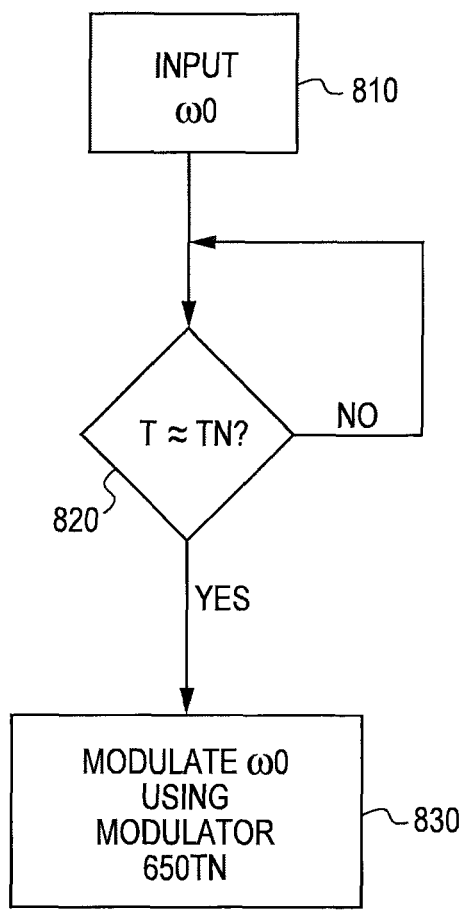
FIG. 8 illustrates a method of operating a silicon optical waveguide in accordance with a disclosed embodiment.

A method 800 of operation of the waveguide system of FIG. 6 is illustrated in FIG. 8. Initially, a laser input of a given frequency $\omega 0$ is input to the waveguide (step 810). The input frequency $\omega 0$ is to be modulated using one or more modulators, depending on the waveguide temperature T. The modulators are each tuned to modulate frequency $\omega 0$ at different temperatures. Thus, for example, modulator 650T1 is tuned to modulate frequency $\omega 0$ at temperature T1. Modulator 650T2 is tuned to modulate frequency $\omega 0$ at temperature T2 which differs from temperature T1. Additional modulators 650TN may be included that each modulate frequency $\omega 0$ (step 830) at respective temperatures TN (step 820).

During operation of the waveguide, if the waveguide temperature T is equal to temperature T1, modulator 650T1 is active in modulating the received frequency $\omega 0$ while other modulators 650T2, 650TN are not active. If the waveguide temperature T changes and equals temperature T2, modulator 650T2 becomes active in modulating the received frequency $\omega 0$ while the other modulators 650T1, 650TN are not active. If the waveguide temperature T changes and equals a temperature in between temperatures T1 and T2, both modulators 650T1 and 650T2 become partially active in modulating the received frequency $\omega 0$ at a reduced modulation depth. Both modulators are driven from the same signal, and hence both can work in conjunction to encode the signal on the received frequency $\omega 0$.

Figure 9A:
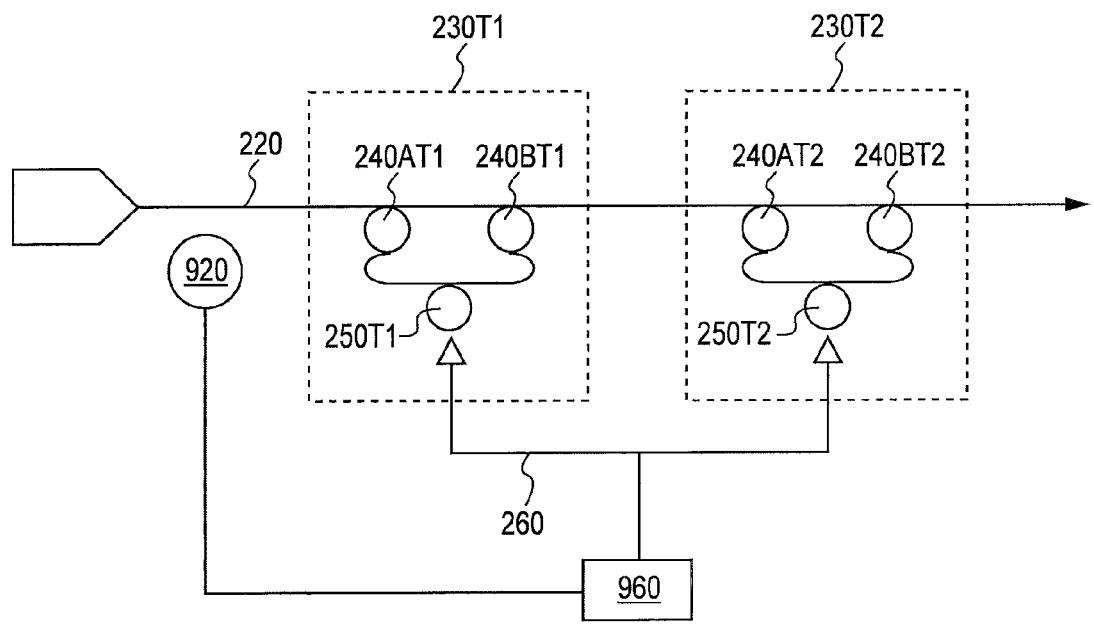
FIGS. 9A and 9B illustrate silicon optical waveguides in accordance with disclosed embodiments.
Figure 9B:
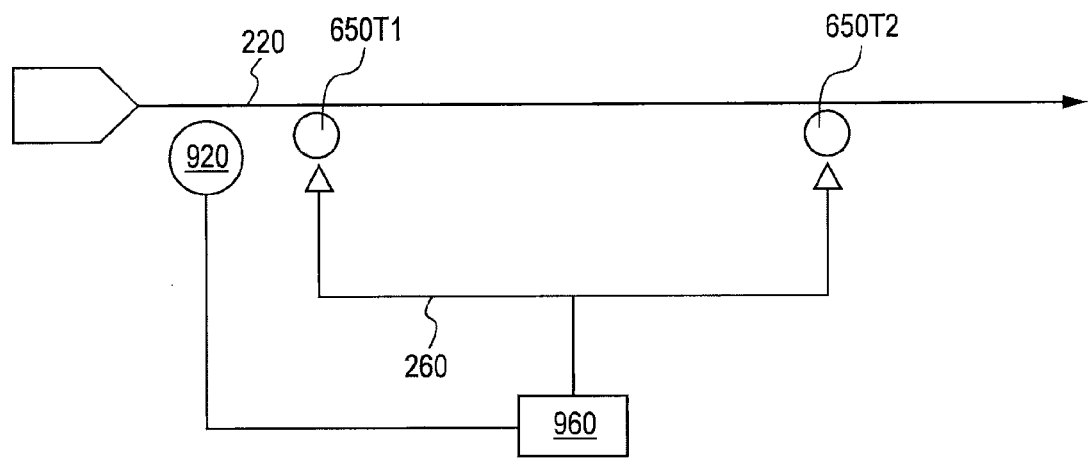

The waveguides 210, 610 may additionally be modified as illustrated in FIGS. 9A and 9B. In FIGS. 9A and 9B, waveguides 910A and 910B, respectively, are modified by the addition of a temperature sensor 920 and a control circuit 960. In the waveguides 910A, 910B, operation of the modulators 250, 650 is optimized by using a temperature sensor 920 whose output enables a control circuit 960 to actively drive the modulators 250, 650. For example, a control algorithm could be used to use the sensed temperature of the optical waveguide to drive specific modulators at specific sensed temperatures. In this way, specific modulators may be driven to provide greater modulation depth for given frequencies than the modulation depth provided by a purely passive modulation circuit. Additionally, the sensed temperature information may be used to help generate specific wavelengths for transmission along the waveguide so that the generated wavelengths correspond to those that the other side of the communications link or waveguide expects to receive.

Figure 10:
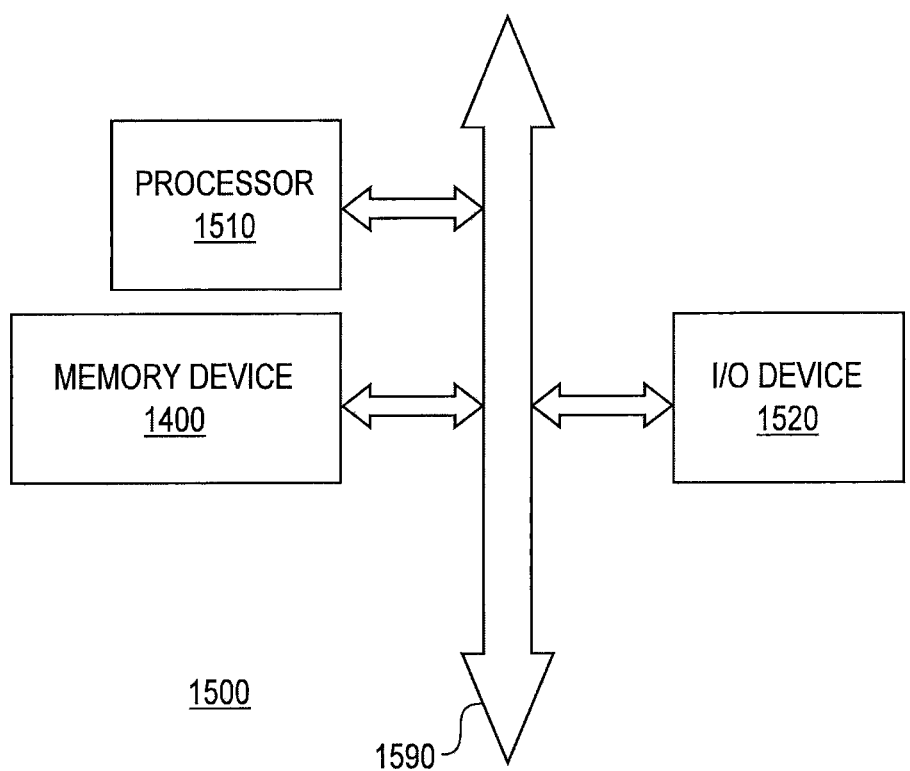
FIG. 10 illustrates a processor system in accordance with a disclosed embodiment.

The improved optical waveguides may be fabricated as part of an integrated circuit. The corresponding integrated circuits may be utilized in a typical processor system. For example, FIG. 10 illustrates a typical processor system 1500 which includes a processor and/or memory device employing improved silicon optical waveguides such as optical waveguides 210, 610, 910A, 910B in accordance with the above described embodiments. A processor system, such as a computer system, generally comprises a central processing unit (CPU) 1510, such as a microprocessor, a digital signal processor, or other programmable digital logic devices, which communicates with an input/output (I/O) device 1520 over a bus 1590. A memory device 1400 communicates with the CPU 1510 over bus 1590 typically through a memory controller. The memory device may include RAM, a hard drive, a FLASH drive or removable memory for example. In the case of a computer system, the processor system may include peripheral devices such as removable media devices 1550 which communicate with CPU 1510 over the bus 1590. If desired, the memory device 1400 may be combined with the processor, for example CPU 1510, as a single integrated circuit.

Any one or more of the components of the processor system 1500 may include one or more of the silicon optical waveguides described above. For example, CPU 1510, I/O device 1520 and memory device 1400 may include silicon optical waveguides. In addition, communication between two or more of the processor system components via bus 1590 may be via silicon optical waveguides 210, 610, 910A, 910B.

The above description and drawings should only be considered illustrative of exemplary embodiments that achieve the features and advantages described herein. Modification and substitutions to specific process conditions and structures can be made. Accordingly, the invention is not to be considered as being limited by the foregoing description and drawings, but is only limited by the scope of the appended claims.

What is claimed is:

1. An optical waveguide, comprising:
   an optical transmission channel for transmitting an optical signal having a first frequency; and
   a plurality of modulator circuits configured along the optical transmission channel, each modulator circuit comprising at least one resonant structure that resonates at the first frequency when the modulator circuit that includes the at least one resonant structure is at a resonant temperature, each modulator circuit having a different resonant temperature,
   wherein modulator circuits having resonant temperatures that are proximate to each other within the plurality of modulator circuits both partially resonate at the first frequency when a temperature of the optical transmission channel is in between the resonant temperatures of the modulator circuits.

2. The optical waveguide of claim 1, wherein the plurality of modulator circuits are in series with each other.

3. The optical waveguide of claim 2, wherein the at least one resonant structure is an optical modulator coupled to the optical transmission channel.

4. The optical waveguide of claim 2, wherein the plurality of modulator circuits each include an optical modulator coupled to the optical transmission channel via an input switch and an output switch.

5. The optical waveguide of claim 4, wherein the at least one resonant structure comprises the input switch.

6. The optical waveguide of claim 2, wherein the at least one resonant structure has a maximum resonance at a respective resonant temperature.

7. The optical waveguide of claim 6, wherein the at least one resonant structure is partially resonant at temperatures within a range of temperatures bounding the structure's respective resonant temperature.

8. The optical waveguide of claim 7, wherein the range of temperatures for the at least one resonant structure corresponding to each modulator circuit overlaps the range of temperatures for at least one resonant structure corresponding with a different modulator circuit.

9. The optical waveguide of claim 8, wherein the overlapping ranges provide at least one overall temperature range in which at least partial resonance occurs at any temperature within the overall temperature range.

10. The optical waveguide of claim 9, wherein the at least partial resonance at any temperature within the overall temperature range results in modulation of the first frequency at any temperature within the overall temperature range.

11. The optical waveguide of claim 10, wherein the modulation depth of the first frequency at any temperature within the overall temperature range is constant.

12. The optical waveguide of claim 2, wherein each of the plurality of modulator circuits is driven by a common signal.

13. The optical waveguide of claim 2, further comprising a temperature sensor and a control circuit that uses the temperature sensed by the temperature sensor to apply driving signals to the plurality of modulator circuits.

14. A silicon optical waveguide, comprising:
    a silicon optical transmission channel for transmitting an optical signal having a first frequency; and
    a plurality of modulators configured along the silicon optical transmission channel, each modulator configured to resonate at the first frequency at a corresponding resonant temperature, each modulator having a different resonant temperature,
    wherein modulators having resonant temperatures that are proximate to each other within the plurality of modulators both partially resonate at the first frequency when a temperature of the silicon optical transmission channel is in between the resonant temperatures of the modulators.

15. The silicon optical waveguide of claim 14, wherein each modulator is resonant at temperatures within a range of temperatures bounding the modulator's resonant temperature.

16. The silicon optical waveguide of claim 15, wherein the ranges of temperatures that each correspond to one of the plurality of modulators overlap each other to provide an overall temperature range wherein resonance at the first frequency occurs at any temperature within the overall temperature range.

17. The silicon optical waveguide of claim 16, wherein the modulation depth of the first frequency at any temperature within the overall temperature range is constant.

18. The silicon optical waveguide of claim 14, further comprising a temperature sensor and a control circuit that uses the temperature sensed by the temperature sensor to apply driving signals to the plurality of modulators.

19. A processor system, comprising:
    a processor that includes at least one silicon optical waveguide, comprising:
    silicon optical transmission channel for transmitting an optical signal input to the optical waveguide with a first frequency; and
    a plurality of modulator circuits configured along the silicon optical transmission channel, each modulator circuit comprising at least one resonant structure that resonates at the first frequency when the modulator circuit that includes the at least one resonant structure is at a resonant temperature, each modulator circuit having a different resonant temperature,
    wherein modulator circuits having resonant temperatures that are proximate to each other within the plurality of modulator circuits both partially resonate at the first frequency when a temperature of the optical transmission channel is in between the resonant temperatures of the modulator circuits.

20. The processor system of claim 19, wherein the at least one resonant structure is an optical modulator coupled to the silicon optical transmission channel.

21. The processor system of claim 19, wherein the plurality of modulator circuits each include an optical modulator coupled to the silicon optical transmission channel via an input switch and an output switch.

22. The processor system of claim 21, wherein the at least one resonant structure is the input switch.

23. The processor system of claim 19, wherein the at least one resonant structure is resonant at temperatures within a range of temperatures bounding the modulator circuit's resonant temperature.

24. The processor system of claim 23, wherein the ranges of temperatures that each correspond to one of the plurality of modulator circuits overlap each other to provide an overall temperature range wherein resonance at the first frequency occurs at any temperature within the overall temperature range.

25. The processor system of claim 24, wherein the modulation depth of the first frequency at any temperature within the overall temperature range is constant.

26. The processor system of claim 19, wherein each of the plurality of modulator circuits is driven by a common signal.

27. The processor system of claim 19, further comprising a temperature sensor and a control circuit that uses the temperature sensed by the temperature sensor to apply driving signals to the plurality of modulator circuits.

* * * * *